Feb. 14, 1961  E. M. HAKANSON  2,971,297
MACHINE TOOL

Filed Jan. 2, 1959  7 Sheets-Sheet 1

INVENTOR
Edgar M. Hakanson
BY
Ernest J. Hix
ATTORNEY

Feb. 14, 1961 E. M. HAKANSON 2,971,297
MACHINE TOOL

Filed Jan. 2, 1959 7 Sheets-Sheet 5

INVENTOR
Edgar M. Hakanson
BY
Ernest J. Hix
ATTORNEY

Feb. 14, 1961 E. M. HAKANSON 2,971,297
MACHINE TOOL
Filed Jan. 2, 1959 7 Sheets-Sheet 7

INVENTOR
Edgar M. Hakanson
BY
Ernest J. Hix
ATTORNEY

United States Patent Office 2,971,297
Patented Feb. 14, 1961

2,971,297

MACHINE TOOL

Edgar M. Hakanson, Vandalia, Ohio, assignor to The Sheffield Corporation, Dayton, Ohio, a corporation of Delaware Filed Jan. 2, 1959, Ser. No. 784,777

14 Claims. (Cl. 51—108)

This invention relates to grinding machines and more particularly to grinding machines for high production precision grinding operation.

It is an object of this invention to provide a grinding machine having a unique grinding approach and unique work handling structure making possible extremely high production rates in a machine involving only a few major grinding components and which is simple and reliable in operation.

It is a further object of this invention to provide a grinding machine for simultaneously grinding a plurality of workpieces through cooperation of opposed regulating and grinding wheels in simultaneous engagement with a plurality of workpieces circumferentially spaced along the wheel peripheries and supported therebetween during grinding.

It is a further object to provide such a grinding machine wherein high production rates are achieved and work handling is simplified through simultaneous transfer of a plurality of workpieces to and from grinding positions between the wheels, and through use of centerless locating structure peripherally supporting and locating the workpieces.

It is a further object to provide such a machine wherein feed means, such as a feed wheel concentric with the regulating wheel, is provided for simultaneously carrying a plurality of spaced workpieces from loading positions to grinding positions spaced circumferentially along the periphery of the regulating wheel, locating and supporting structure cooperating with the regulating wheel at each grinding position to precisely position each workpiece for simultaneous engagement by a single grinding wheel during the grinding process.

It is a further object to provide such a grinding machine wherein workpieces are loosely carried to the grinding positions by the feed means, supporting rolls then being brought into peripheral engagement with each workpiece in opposition to the regulating wheel for precise positioning, following which the regulating and grinding wheels are relatively positioned to bring the located workpieces and the grinding wheel into simultaneous grinding engagement for simultaneously grinding the workpieces in a centerless manner.

It is a further object to provide such a machine wherein a pair of workpieces are supported equally spaced at opposite sides of a line between the centers of the cooperating regulating and grinding wheels which they engage during grinding, whereby the workpieces are simultaneously ground to equal dimensions by the same grinding wheel and while supported in a centerless manner.

Other objects and advantages of this invention will be apparent from the following description, the appended claims, and the accompanying drawings, in which.

In the grinding machine of the present invention a number of workpieces are ground through simultaneous engagement with the same cooperating regulating and grinding wheels while circumferentially spaced therealong. Such a regulating wheel drives and aids in positioning the workpiece and could be, as examples, of an abrasive, steel or other durable material providing a driving surface. Extremely high production rates are thus achieved in a single machine involving a minimum number of major grinding components. Precision grinding operations are accomplished as a plurality of workpieces are transferred at a time to grinding positions and are supported in a centerless manner during grinding by a single grinding wheel simultaneously engaging all the workpieces.

In the exemplary embodiment illustrated a feeding wheel providing feeding pockets or stations along the periphery of the regulating wheel is indexed to simultaneously bring a pair of workpieces from loading positions to grinding positions. Support means are then brought into peripheral engagement with the workpieces in opposition to the regulating wheel, following which the grinding wheel is brought into simultaneous engagement with the supported workpieces. After this the wheel is indexed and the workpieces are further transferred for unloading or gaging. While exemplary embodiments and applications of the present invention are illustrated and described for purpose of disclosing the present invention, it will be understood that this invention is not limited to the specific structural details illustrated or to such applications.

Figures 1, 2:
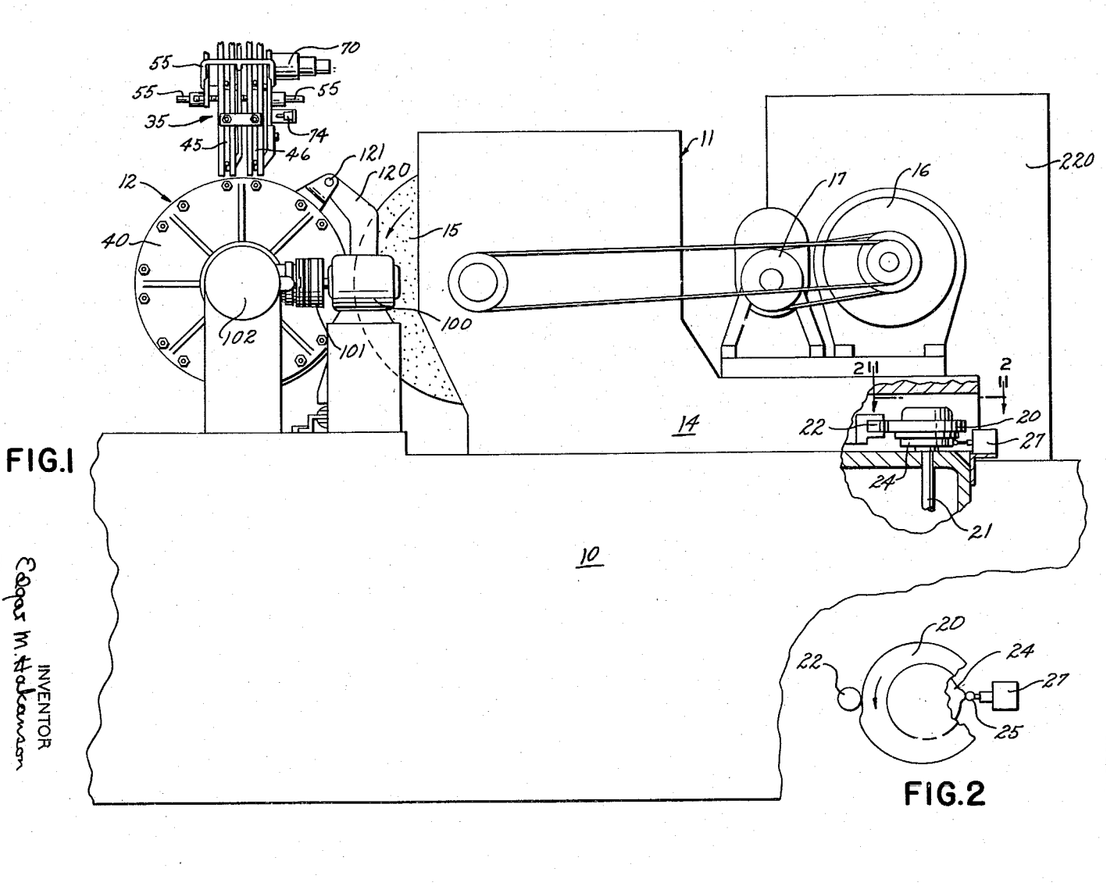
Figure 1 illustrates an exemplary grinding machine embodying the present invention.
Figure 2 is a fragmentary illustration of a portion of the machine of Figure 1, taken on line 2—2.

Referring more particularly to the drawings, Figure 1 illustrates an exemplary grinding machine embodying the present invention and including a base 10 supporting a wheelhead 11 and a workpiece handling unit 12 which cooperate for the grinding operation.

The general construction and operation of wheelhead 11 can be similar to that of the machine illustrated and described in detail in co-pending application Serial No. 607,888, filed September 4, 1956, now U.S. Patent No. 2,919,519, issued January 5, 1960. As shown, the wheelhead includes a slide 14 which rotatably supports a grinding wheel 15 and drive motors 16 and 17 therefor. Slide 14 is guided, in this embodiment, on base 10 for rectilinear movement toward and from workpiece handling unit 12 along a line extending between the center of wheel 15 and the center of the rotatable components of unit 12. During the grinding operation a feeding cam 20 (see Figure 2) is rotated by means of a drive motor connected to shaft 21. Roller 22 mounted on slide 14 acts as a follower to move grinding wheel 15 cyclically to and from grinding position. The particular details of the drive system for feed cam 20 are not shown because the particular feeding arrangemnet for the grinding wheel forms no essential part of the present invention. However, it can be of the general nature disclosed in the application previously referred to. Lobed cam 24 rotates with feed cam 20 and cooperates with the follower 25 of a switch unit 27 to signal positions of feed cam 20 and grinding wheel 15.

Figure 4:
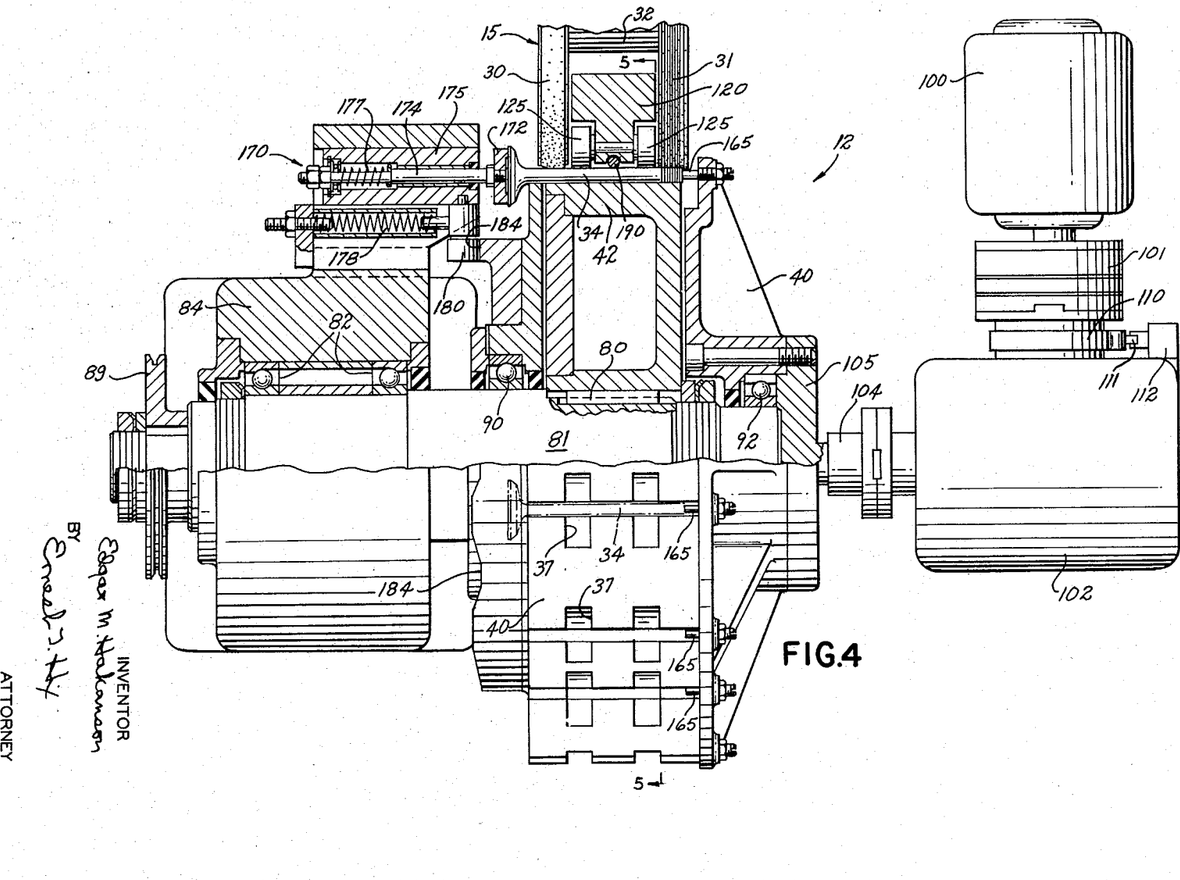
Figure 4 is a plan view, partially broken away to horizontal central section, illustrating the major portion of the feeding structure for transferring workpieces to and from grinding position.

In this exemplary application grinding wheel 15 has axially spaced grinding wheel portions 30 and 31 at each side of an adaptor 32 (see Figure 4). Portions 30 and 31 engage axially spaced locations on an automotive type valve 34 for grinding keeper grooves at one end thereof and an undercut adjacent the head thereof.

Figures 5, 6:
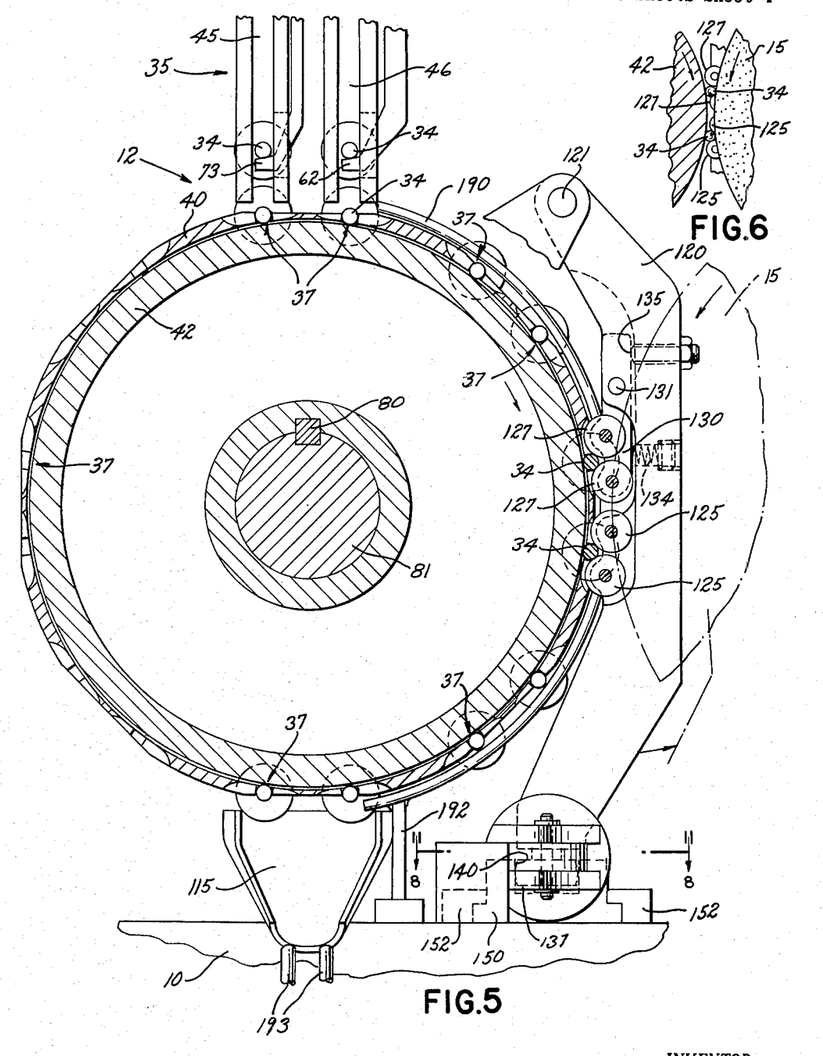
Figure 5 is a sectional view taken on line 5—5 of Figure 4.
Figure 6 is a fragment, illustrating a portion of Figure 5 with the workpieces and grinding wheel in grinding position.

Workpiece handling unit 12 includes an escapement 35 which operates to drop workpiece valves 34 into pockets or stations 37 provided along a feeding wheel 40 which indexes concentrically about a continuously driven regulating wheel 42. As feeding wheel 40 indexes in a clockwise direction as seen in Figure 5 it carries a pair of workpieces from loading positions just below escapement 35 to grinding positions in the horizontal quarter of the wheel and from these positions to locations below the wheel for unloading by gravity.

Figure 3:
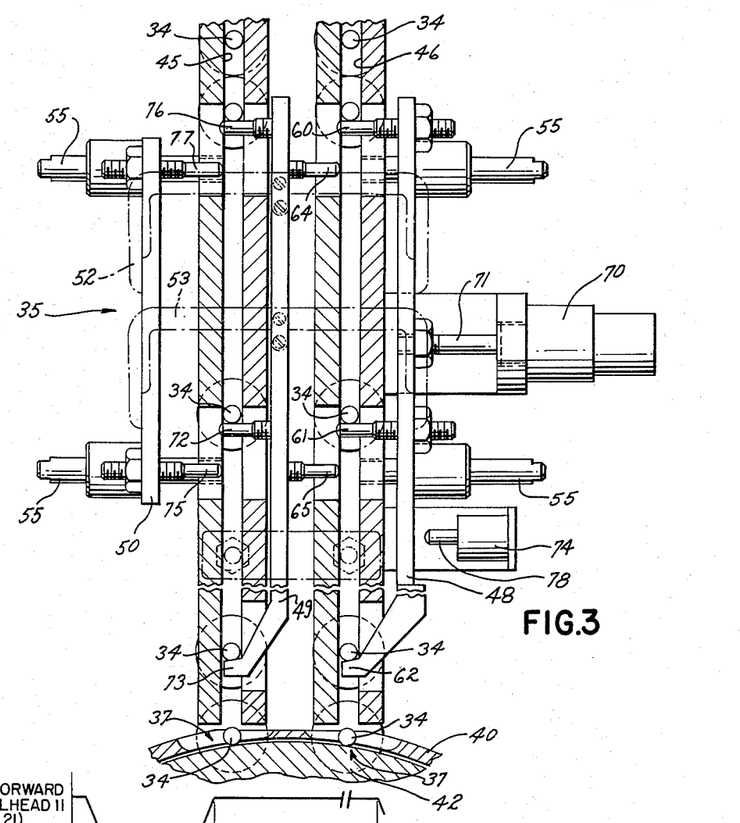
Figure 3 is a central vertical sectional view taken through the escapement loading structure of the machine of Figure 1.

As seen particularly in Figure 3, escapement 35 provides two substantial identical escapement assemblies including chutes 45 and 46 holding stacks of automotive valves at their upper ends. Escapement 35 includes parallel escapement plates 48, 49 and 50 all interconnected by rods 52 and 53 extending from one side of escapement 35 to the other. Outermost plates 48 and 50 are supported and guided by sliding on pins 55 fixed in the assembly.

Plates 48 and 49 respectively carry escapement abutments 60, 61, 62 and 64, 65. These abutments cooperate within chute 46 for the sequential feeding of valves as plates 48 and 49 are horizontally reciprocated by means of air cylinder 70 and connecting rod 71 fixed to plate 48. Air cylinder 70 is a double acting cylinder sequentially energized for movement of rod 71 and plates 48 and 49 alternatively in reverse directions. Thus abutment sets 60, 61, 62 and 64, 65 are alternatively projected into chute 46 for the sequential feeding of valves by gravity into stations 37 in feeding wheel 40. Abutment sets 76, 72, 73 and 77, 75 similarly cooperate in chute 45 for sequential feeding.

The escapement abutments are shown in locked or retaining positions. When cylinder 70 is energized to draw rod 71 to the right the lowermost pair of valves 34 is released and dropped by gravity into the stations of feeding wheel 40. Upon reverse energization of cylinder 70 the abutments are restored to their previous positions. While a reduced number of feeding abutments would theoretically perform the sequential feeding operation it has been found in practice that a more reliable result is achieved with a construction as shown. A limit switch 74 has a plunger 78 projecting for engagement by plate 48 upon its movement to the right. Thus switch 74 provides a signal for movement of the escapement abutments.

Regulating wheel 42 is particularly illustrated in Figures 4 and 5. It is keyed at 80 to a shaft 81 supported in bearings 82 in a pedestal 84 on base 10 of the machine. Regulating wheel 42 is continuously driven frrom motor 87 through belt 88 and pulley 89 fixed to shaft 81.

Feeding wheel 40 is supported concentrically on shaft 81 by bearings 90 and 92. Feeding stations 37 are provided by suitable cutout portions in the peripheral portion of wheel 40 at spaced locations along the periphery of regulating wheel 42. Thus upon operation of escapement cylinder 70 a pair of valves 34 are dropped into stations 37 and are loosely held therein.

An index drive is provided for intermittent rotation of feeding wheel 40. It includes motor 100, a combination clutch and brake unit 101, and a commercially available index unit 102. The output of index unit 102 is connected through shaft 104 and flange 105 to feeding wheel 40. A single lobed cam 110 cooperates with the follower 111 of a signal switch 112 to indicate full 360° rotation of the input to index unit 102. Motor 100 is continuously rotated and when an index signal is provided from the controlling electrical circuit the brake of unit 101 is released and the clutch simultaneously engaged. When the lobe of cam 110 again engages follower 111 the brake is engaged and clutch released to discontinue the rotation. Index unit 102 is of a type which insures that the desired degree of rotation of feeding wheel 40 is obtained for each approximate 360° rotation of the input shaft. Thus through this drive a pair of workpieces is sequentially moved from loading positions, to grinding positions, and then to unloading positions.

In the exemplary embodiment illustrated, feeding wheel 40 is indexed in 45° increments. Loading positions are just below the outlets of chutes 45 and 46 of escapement 35. The parts are indexed from these positions in two steps to approximate grinding positions equally spaced above and below a line extending between the centers of regulating wheel 42 and grinding wheel 15. Following this, the parts are carried to a position below the axis of rotation of regulating wheel 42 and feeding wheel 40 for unloading by gravity into a receiving chute 115. During this operation regulating wheel 42 continuously rotates in a clockwise direction as seen in Figure 5.

Workpiece valves 34, while loosely positioned by feeding wheel 40, are precisely located and supported during grinding by support means engaging their peripheries in opposition to and in cooperation with regulating wheel 42 which also engages the workpieces.

As illustrated this support means includes an arm 120 pivoted at 121 on base 10. Arm 120 is actuated through a cam arrangement at its lower end to swing from its locating and supporting position shown in Figure 5 in a counter-clockwise direction to clear the workpieces for further feeding. As shown, there are four supporting rolls carried by arm 120 for each of the workpieces being ground. Rolls 125, which peripherally engage the lower workpiece 37 to urge it into engagement with regulating wheel 42 and precisely locate it during grinding, are carried directly by arm 120. Rolls 127 which similarly engage the upper workpiece valve 34 are rotatably mounted on a segment 130 pivoted at 131 on arm 120. Segment 130 is engaged by a stout spring 134 to provide some yielding while abutment 135 limits its pivoting movement under the urging of spring 134. Through this arrangement there is accommodation for variation in unground workpiece size and assurance that all of the supporting rolls will firmly engage the workpieces during grinding.

Figure 7:
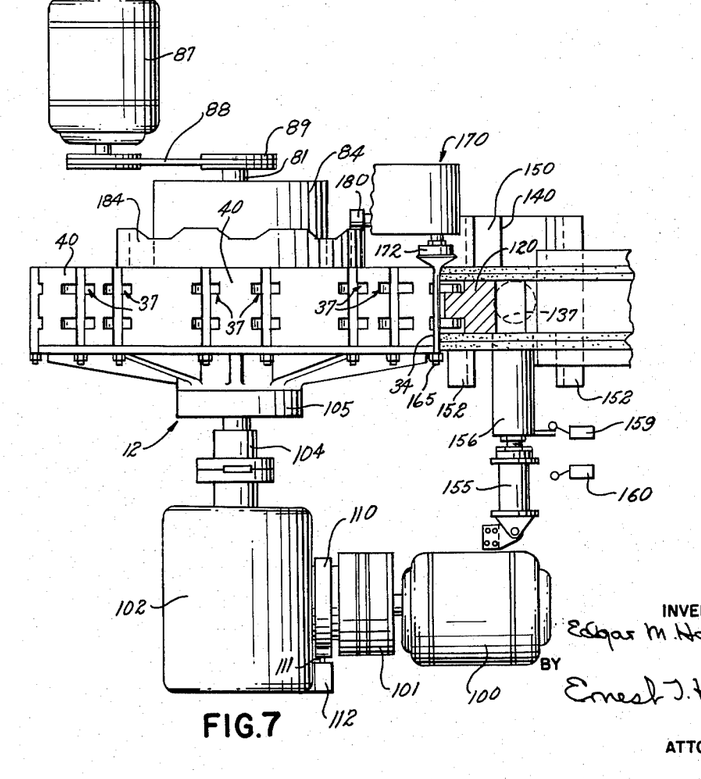
Figure 7 is a plan view of the work handling structure, showing particularly the actuating arrangement for clamping the workpieces in engagement with the regulating wheel.
Figure 8:
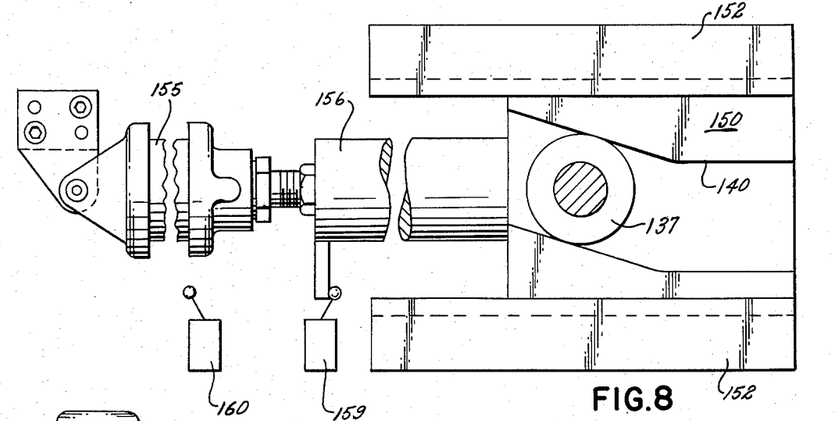
Figure 8 shows an enlarged portion of the work clamping means.

The cam actuating structure for the supporting rolls is most clearly shown in Figures 7 and 8. It includes a follower roller 137 rotatable on the lower end of arm 120 and engaging a track 140 on slide 150 reciprocal along ways 152. A piston within an air cylinder 155 is connected through rod 156 with slide 150. As rod 156 is reciprocated slide 150 is simultaneously moved to rock arm 120 in one direction to support and locate workpieces at grinding positions and in the other to clear the workpieces for further transfer by feeding wheel 40. Limit switches 159 and 160 signal the extremes of these movements.

Endwise reference locators for each of the workpieces in the stations 37 of wheel 40 are provided by pins 165 at each station. These pins are adjustably threaded as shown for the pin 165 in the upper portion of Figure 4. A positioning assembly 170 is provided at each of the grinding positions above and below the line extending between the centers of grinding wheel 15 and regulating wheel 42. The assemblies are identical and as shown in Figure 4 each includes a positioner 172 mounted on a rod 174 reciprocal in a carriage 175. A spring 177 cooperates between rod 174 and carriage 175 to yieldably urge positioner 172 to the right as seen in that figure. The carriage 175 is urged to the right by spring 178 which also maintains a follower 180 on carriage 175 in firm engagement with a cam track 184 at one face of feeding wheel 40 concentric with shaft 81. As feeding wheel 40 indexes, cam 184 operates through follower roller 180 to retract carriage 175 and positioner 172. This clears the workpiece valve 34 for further index movement. When a workpiece is brought to grinding position cam 184 acts to allow positioner 172 to engage the adjacent end face of the workpiece valve and move it as necessary axially to bring its opposite end into engagement with the locator pin 165. Thus each valve is precisely positioned endwise during grinding. If desired rollers or other friction reducing means can be provided at the end of positioner 172 because it is only an endwise thrust against the valve that is required.

Figure 6 is a diagrammatic fragment illustrating the positions and direction of rotation of the various operating components during grinding. It will be seen that workpiece valves 34 are equally positioned above and below a line between the centers of grinding wheel 15 and regulating wheel 42 for equal grinding operations thereon. During grinding each workpiece is precisely located and held by the cooperation of rolls 125, 127 with regulating wheel 42. Simultaneously they are endwise positioned through engagement with the locator pins 165.

Rather than equally spaced above and below a line between the regulating and grinding wheel centers as shown, a plurality of grinding stations can be provided with one station on the line between centers or otherwise relatively spaced for unequal grinding. Ground workpieces of different sizes could thus be obtained or, by sequentially indexing a workpiece through such an arrangement of stations, approach and finish grinds provided for applications as desired.

Figures 9, 10:
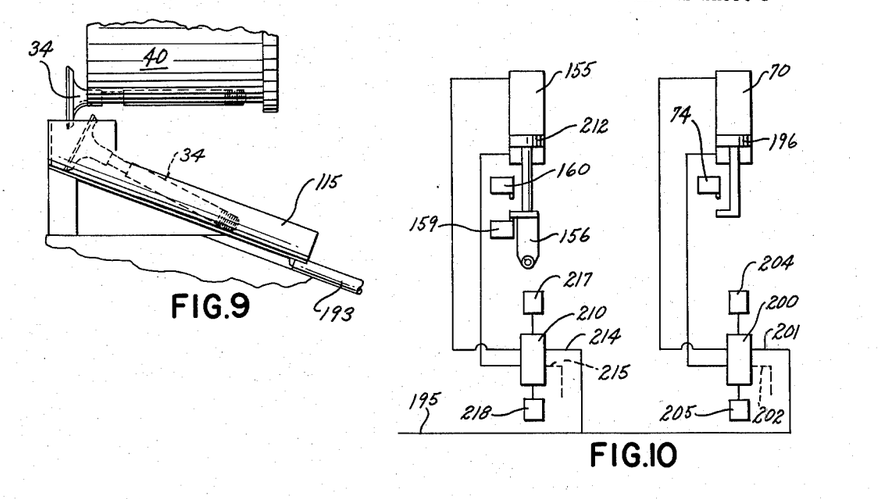
Figure 9 illustrates a portion of the receiving arrangement into which the workpieces drop by gravity following grinding.
Figure 10 is a diagrammatic illustration of a pneumatic circuit for actuating components of the work handling structure.

A retaining bar 190 (see Figure 5) extends from the loading positions through the grinding positions and to the unloading positions below the axis of shaft 81. Bar 190 is mounted by post 192 extending from base 10. A side view of unloading or receiving chute 115 is shown in Figure 9. Through the configuration of this chute valves dropped thereinto slide down and are suspended by their enlarged head portions as they hang through engagement with spaced bars 193.

A pneumatic diagram is shown in Figure 10 for the operation of escapement cylinder 70 and clamping cylinder 155. Air under pressure is supplied from a suitable source through conduit 195. The operation of piston 196 in cylinder 70 is controlled by valve 200 receiving air under pressure through connection 201 and exhausting through connection 202. Through alternative energization of solenoids 204 and 205 connected to valve 200 piston 196 is moved in reverse directions. Similarly valve 210 controls the movement of piston 212 within cylinder 155. Valve 210 receives air under pressure through connection 214 and exhausts through connection 215. Its operation is controlled by solenoids 217 and 218.

Figure 11:
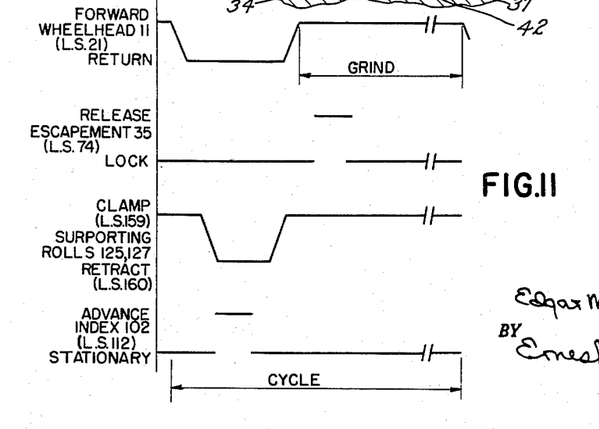
Figure 11 is a timing diagram illustrating the relative timing of operations of the machine of Figure 1.

Through the signals provided by signal switches 27, 74, 112, 159 and 160 previously discussed, the pneumatic circuit of Figure 10, and a conventional electrical control circuit housed in cabinet 220, a sequence of operation is carried out as illustrated in the timing diagram of Figure 11. As shown in that diagram, as feed cam 20 rotates in a counter-clockwise direction as shown in Figure 2 it feeds grinding wheel 15 (wheelhead 11) in for the grinding operation. As it reaches the high point of the cam the grinding operation is completed and follower 22 falls gently off the rise to the lower portion of cam 20. This is signaled by switch 27 which, through the controlling circuit of cabinet 220, energizes solenoid 217 to actuate valve 210, retracting piston 212 and moving clamping rolls 125, 127 away from the workpieces at grinding positions. Upon retraction of piston 212 switch 160 is actuated to signal completion of this movement. Following this, unit 101 is energized to release the brake it contains and engage the clutch for driving of index 102. Upon completion of the index movement switch 112 is again actuated. During the index cycle cam 184 retracts positioner 172 to allow the next pair of workpieces to enter the grinding positions.

Switch 112 operates to reverse the energization of unit 101 and brake the index while releasing the clutch. Energization of this switch also results in operation of solenoid 218 to return the clamping rolls toward regulating wheel 42 and into precise peripheral locating engagement with a pair of workpieces 34. Movements of rolls 125, 127 to clamping engagement with the workpieces is signaled by energization of limit switch 159, providing a signal for initiation of rotation of feed cam 20 which has remained stationary. Thus the grinding cycle is repeated.

Energization of switch 159 provides a signal for operation of solenoid 204, actuating valve 200 and moving piston 196 to a retracting position, releasing a pair of workpieces into feed wheel 40. Engagement of switch 74 during this movement results in solenoid 205 being energized and the escapement is returned to its locked position. Limit switch 74 also serves as an interlock so that if workpieces are not loaded into the feeding wheels the next grinding cycle will not be initiated. Thus it is seen that the grinding cycle is carried out in an automatic manner with a sequential operation of major components to position a plurality of workpieces at grinding positions in engagement with a regulating wheel and precisely peripherally supported. The grinding wheel is brought into simultaneous engagement with the parts so that a high production operation is achieved with a single grinding wheel and a minimum number of major components in a simple and reliable machine.

Figure 12:
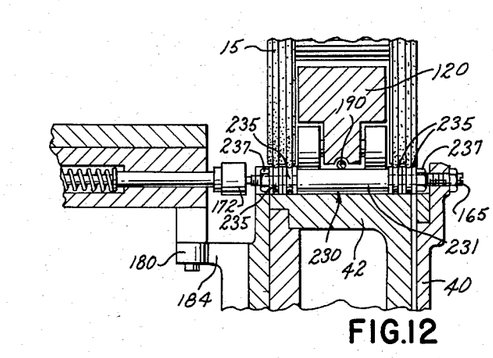
Figure 12 is a fragmentary sectional view similar to the corresponding part shown in Figure 4 but illustrating a modified workpiece arrangement in which a number of parts are simultaneously ground and handled together.
Figure 13:
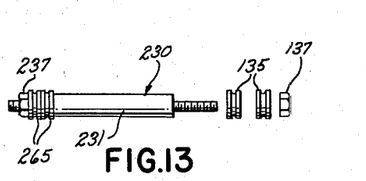
Figure 13 shows the part supporting arbor of the workpiece of Figure 12 with the right-hand portion thereof in exploded illustration.

As used herein the term workpiece is intended to indicate the work unit which is transferred from position to position during the grinding cycle. Figures 12 and 13 illustrate a workpiece 230 which includes a supporting arbor 231 carrying a plurality of parts 235 shown as inner ball races. In this example arbor 231 is threaded at each end and a pair of parts are held thereon by nuts 237. This workpiece is handled and located in a manner similar to that for valve workpieces 34 in the embodiment previously described. Through this arrangement not only are a plurality of workpieces simultaneously ground but each workpiece includes a plurality of similar parts precisely located for extremely high production operations.

Figure 14:
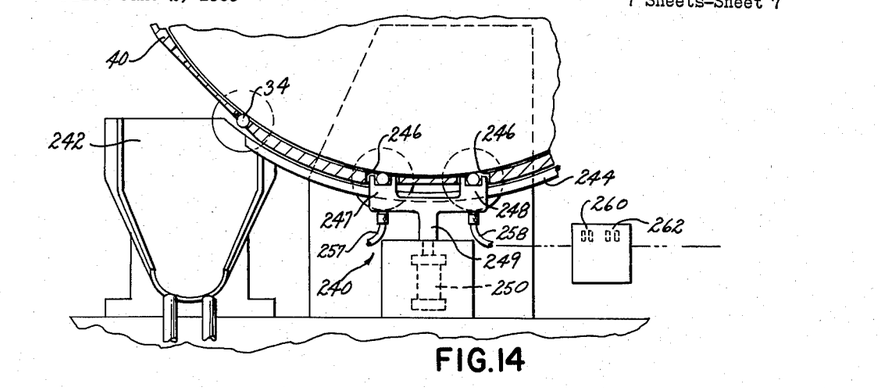
Figure 14 illustrates a modified arrangement wherein a gaging station is provided between the grinding and unloading positions.
Figure 15:
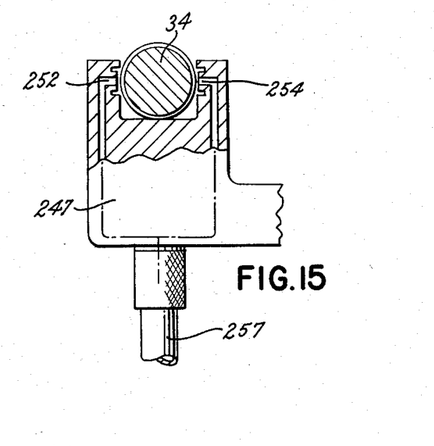
Figure 15 illustrates one of the gage heads of Figure 14, shown partially in vertical central section.
Figure 16:
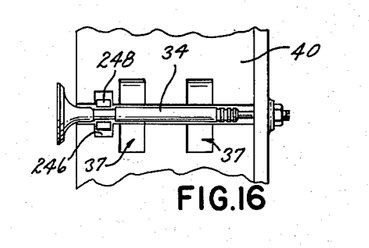
Figure 16 shows the modified feeding wheel used with the gaging station.

In the modification of Figures 14 to 16 the index movement of feeding wheel 40 is used to transfer the workpieces following grinding to a gaging station 240 at the lower portion of unit 12 and from station 240 to an unloading chute 242. Retaining bar 244 is extended through station 240 and to unloading chute 242 so that the workpieces are sequentially transferred from the grinding positions, to gaging positions in station 240, and then to unloading positions.

In this illustrative example station 240 is provided to gage the diameter of a portion of a workpiece valve previously ground at the grinding positions. Each station 37 in wheel 40 is modified by an additional cutout 246 which provides clearance for gaging calipers 247 and 248 carried on a common support 249 actuated by cylinder 250. Each of the gaging calipers is constructed as shown in Figure 15. Caliper 247 includes opposed air leakage orifices 252 and 254 connected to a common conduit 257. A conduit 258 is provided for the orifices in caliper 248. Each of conduits 257 and 258 can be connected to a conventional pneumatic gaging circuit for indicating the workpiece dimensions or for actuating switch contacts such as schematically indicated at 260 and 262 for caliper 248. A suitable circuit for use with these calipers is illustrated and described in Patent Number 2,593,958, issued April 22, 1952. While a pneumatic type gaging circuit has been illustrated it will be appreciated that other materially different gaging circuits and materially different gaging applications can be involved. Through the illustrated strutcure feed movement of wheel 40 is used for transfer to and from a gaging station provided in association therewith.

During operation of the gaging station 240 cylinder 250 is energized to move calipers 247 and 248 forward while feeding wheel 40 is stationary. Thus the dimensions are gaged. Calipers 247 and 248 are retracted prior to index movement of feeding wheel 40. The signals provided by switches 260 and 262 can be used for selection of reject or acceptable workpieces, for segregation of the workpieces in accordance with their dimensions, for control of the grinding cycle itself, or for other purposes as will be fully appreciated by those skilled in the art.

Figure 17:
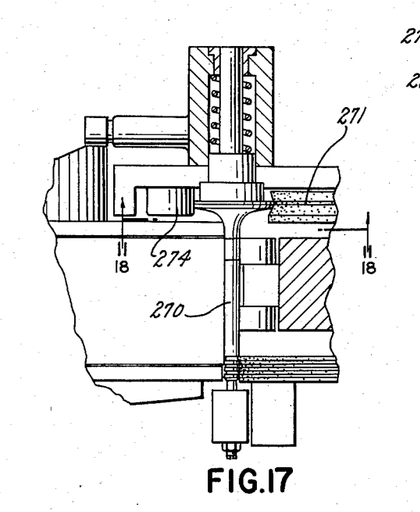
Figure 17 illustrates a work support and locating arrangement wherein the head of an automotive type valve is being ground and partially supported during the grinding operation.
Figure 18:
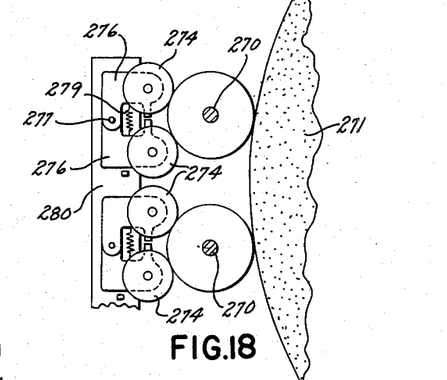
Figure 18 is an illustration of the arrangement of Figure 17 taken on line 18—18.

In the modification of Figures 17 and 18 a grinding operation is being performed on the head of an automotive valve 270 which is fed and located in a manner similar to that for valves 34 in the previous embodiment discussed. In this application the grinding wheel has a grinding portion 271 beyond the plane of the regulating and feeding wheels for grinding engagement with the valve head. During grinding operations rolls 274 engage the opposite surface of the valve head. These rolls are carried in cooperating pairs on arms such as those indicated at 276 for the uppermost pair of rolls 274 in Figure 18. These arms are pivoted at 277 and are spring urged toward one another by a spring such as indicated at 279. The supporting structure for rolls 274 is carried on a major arm 280 which can be actuated to and from engagement with the valve heads in a manner similar to that of arm 120 in the machine of Figure 1. Provision of rolls 274 in engagement with the valve heads in opposition to the grinding wheel portion 271 partially supports the valve heads and dampens any chatter which might result during the grinding operation.

It will be seen that the present invention makes possible extremely high production rate of parts and also provides a simple and reliable transfer for gaging operations as desired. High production rates with centerless locating of parts is achieved. Extreme flexibility in operation and application is possible.

While the forms of apparatus herein described constitute preferred embodiments of the invention, it is to be understood that this invention is not limited to these precise forms of apparatus and that changes may be made therein without departing from the scope of the invention which is defined in the appended claims.

What is claimed is:

1. A grinding machine comprising a base, a regulating wheel, a grinding wheel, drive means for said grinding wheel, carriage means mounting said regulating wheel and said grinding wheel on said base for relative movement toward one another to grinding position and for relative retraction, support means on said base for holding a pair of workpieces in driven engagement with said regulating wheel at fixed grinding locations relatively circumferentially spaced along its periphery, and actuating means operatively connected to said carriage means for relatively moving said regulating and grinding wheels toward one another to bring them into grinding position with the grinding wheel in simultaneous grinding engagement with both said parts for a grinding operation thereon, whereby a plurality of workpieces are simultaneously ground while in association with the same cooperating regulating and grinding wheels.

2. A grinding machine comprising a base, a regulating wheel rotatably mounted on said base, drive means for said regulating wheel, a wheelhead including a grinding wheel and drive means therefor, carriage means on said base mounting said wheelhead for movement toward said regulating wheel to a grinding position and for retraction therefrom, feed means on said base for simultaneously transferring a pair of workpieces into driven engagement with said regulating wheel at fixed grinding locations relatviely circumferentially spaced positions along the periphery thereof, and actuating means operatively connected to said wheelhead for movement thereof from a retracted positon forward to bring said grinding wheel into simultaneous grinding engagement with the pair of workpieces as they are rotated by said regulating wheel, whereby a plurality of workpieces are simultaneously ground while in association with the same cooperating regulating and grinding wheels.

3. A grinding machine comprising a base, a regulating wheel, a grinding wheel and drive means therefor, carriage means rotatably supporting both said wheels on said base for relative movement toward one another to grinding position and for retraction therefrom, feed and locating means on said base for simultaneously transferring a pair of workpieces into driven engagement with said regulating wheel at fixed grinding positions relatively circumferentially spaced along the periphery thereof and holding the workpieces centered at the grinding positions through engagement with the peripheries thereof, and actuating means operatively connected to said carriage means for relatively moving said regulating and grinding wheels toward one another into grinding position with the grinding wheel in simultaneous engagement with both said peripherally centered workpieces for grinding operations thereon, whereby a plurality of workpieces are simultaneously ground in a centerless manner while in association with the same cooperating regulating and grinding wheels.

4. A grinding machine comprising a base, a regulating wheel rotatably supported on said base, a grinding wheel and drive means therefor, carriage means on said base supporting both said wheels for relative movement toward one another to grinding position and for relative retraction therefrom, feed means on said base for simultaneously transferring a pair of parts from receiving positions to approximate grinding positions in simultaneous driven engagement with said regulating wheel at fixed relatively circumferentially spaced locations along the periphery thereof, support means on said base movable into peripheral supporting engagement with spaced workpieces at the grinding positions in opposition to said regulating wheel and cooperating with said regulating wheel for precisely centering said workpieces for grinding, actuating means operatively connected to said carriage means for relatively moving said regulating and grinding wheels toward one another into simultaneous engagement with workpieces at opposite sides of a line between the wheel centers, and control means operatively connected to said support means and said actuating means for sequentially moving said support means into peripheral engagement with spaced workpieces at the grinding positions and then operating said actuating means to relatively move said regulating and grinding wheels to simultaneous engagement with both workpieces, whereby a plurality of workpieces are simultaneously ground in a centerless manner while in association with the same cooperating regulating and grinding wheels.

5. A grinding machine comprising a base, a regulating wheel rotatably supported on said base, drive means for said regulating wheel, a wheelhead including a grinding wheel and drive means therefor, feed means on said base for simultaneously transferring a pair of parts from receiving positions to approximate grinding positions in simultaneous driven engagement with said regulating wheel at relatively circumferentially spaced locations along the periphery thereof, support means on said base movable into peripheral supporting engagement with spaced workpieces at the grinding positions in opposition to said regulating wheel and cooperating with said regulating wheel for precisely centering said workpieces for grinding, carriage and actuating means for said wheelhead for directing its movement relative to said regulating wheel along a line between the wheel centers intersecting the regulating wheel surface at a point equidistant between the grinding dispositions of said spaced workpieces for equal grinding operations thereon, and control means operatively connected to said support means and said actuating means for sequentially moving said support means into peripheral engagement with spaced workpieces at the grinding positions and then moving said wheelhead forward to simultaneously engage said grinding wheel with both workpieces, whereby a plurality of workpieces are simultaneously ground in a centerless manner while in association with the same cooperating regulating and grinding wheels equally spaced at opposite sides of a line between their centers.

6. A grinding machine comprising a base, a regulating wheel, means rotatably supporting said regulating wheel on said base, drive means operatively connected to said regulating wheel, a wheelhead including a grinding wheel and drive means therefor, carriage means cooperating between said wheelhead and said base for movement of said wheelhead toward said regulating wheel to grinding position, workpiece feed and locating means including a feeding wheel extending concentrically about the periphery of said regulating wheel and providing spaced feeding stations therealong, loading means for simultaneously loading a pair of workpieces into stations of said feeding wheel at relatively spaced locations along the periphery of said regulating wheel, an index drive connected to said feed wheel for index movements thereof to carry said spaced workpieces simultaneously from loading positions to spaced grinding positions on opposite sides of a line between the centers of said regulating and grinding wheels, said workpieces engaging said regulating wheel during grinding for rotation thereby, and actuating means operatively connected to said wheelhead for movement thereof from retracted position forward into simultaneous engagement with spaced workpieces positioned by said feed and locating means, whereby a plurality of workpieces are simultaneously ground while in association with the same cooperating regulating and grinding wheels.

7. A grinding machine comprising a base, a regulating wheel on said base, drive means operatively connected to said regulating wheel, a wheelhead including a grinding wheel and drive means therefor, carriage means cooperating between said base and said wheelhead for movement thereof along a line between the wheel centers toward the regulating wheel to grinding position and for retraction therefrom, a feeding wheel rotatably supported on said base extending concentrically along the periphery of said regulating wheel and providing spaced feeding stations therealong for loosely locating workpieces loaded thereinto, means for loading a pair of workpieces into spaced stations on said feeding wheel at relatively spaced locations along the periphery of said regulating wheel, an index drive operatively connected for step by step rotation of said feeding wheel to simultaneously carry said spaced workpieces from the loading positions to approximate grinding positions equally spaced at the opposite sides of the line between the centers of said regulating and grinding wheels, support means on said base including cooperating pairs of supporting rolls movable from retracted positions forward into simultaneous peripheral engagement with workpieces disposed at the grinding positions for precisely centering said workpieces for grinding, and control means operatively associated with said support means and said wheelhead for sequentially moving said rolls into supporting engagement with workpieces in grinding positions and then moving said grinding wheel forward into simultaneous grinding engagement therewith for equal grinding operations thereon and for reversing said sequence following grinding to clear said workpieces for further movement to unloading positions by said feeding wheel, whereby a plurality of workpieces are simultaneously ground while in association with the same cooperating regulating and grinding wheels.

8. A grinding machine as set forth in claim 7 wherein said support means includes an arm pivotally supported on said base and mounting said supporting rolls, and actuating means for said arm including cam means for movement of said rolls toward and from peripheral engagement with workpieces in grinding position.

9. A grinding machine as set forth in claim 7 wherein said support means includes a locating abutment fixed to said feeding wheel at each station for locating engagement with one end surface of a workpiece to be ground, positioning means on said base at each grinding position carried for reciprocatory movement parallel to the axis of said regulating wheel to and from engagement with the opposite end of a workpiece to move it into locating engagement with the respective locator, and cam means cooperating between said feeding wheel and said positioning means for operation thereof in timed relation to feeding movements of said feeding wheel.

10. A grinding machine as set forth in claim 7 wherein said regulating and grinding wheels are rotatable on horizontal axes, said loading means comprising escapement means for releasing a pair of parts for simultaneous movement by gravity into spaced feeding stations at the upper quarter of said regulating wheel, and comprising retaining means extending from the upper loading positions, through the grinding positions and below to maintain said workpieces in said feeding stations during index movement, and receiving means on said base below said regulating wheel for receiving workpieces dropped from said feeding stations by gravity from positions beyond said retaining means.

11. A grinding machine as set forth in claim 7 wherein each workpiece includes a supporting member for simultaneously supporting and locating a plurality of parts to be ground, and clamp means cooperating with said member for maintaining said parts in fixedly located positions on said member during feeding movement of the workpiece, said grinding wheel including axially spaced grinding portions for simultaneously grinding engagement with the parts as each workpiece is supported and located at a grinding position.

12. A grinding machine as set forth in claim 7 wherein said workpiece is a valve having a stem and a head, said feeding means including means for positioning a valve in grinding position with the head thereof extending beyond said regulating wheel, said grinding wheel including a portion axially beyond said regulating wheel and in a common plane with said valve head for grinding engagement therewith, said support means further including a pair of rolls at each grinding position for engagement with said valve head in opposition to said grinding wheel portion at a location axially beyond said regulating wheel for engagement with said valve head during grinding.

13. A grinding machine as set forth in claim 7 wherein said grinding wheel has axially spaced grinding portions for simultaneous grinding engagement with axially spaced portions on spaced workpieces extending across said regulating wheel, said supporting rolls being carried for engaging said workpiece at locations between the segments of said grinding wheel and in opposition to said regulating wheel, whereby the parts are precisely positioned and held for grinding.

14. A grinding machine as set forth in claim 7 further comprising a gaging station on said base in cooperation with said feeding wheel at a location between grinding and unloading positions, said index drive including means operating said feeding wheel for transferring workpieces from grinding positions to said gaging station and then to unloading positions, said gaging station including a gage head for measuring a surface of said workpiece previously ground at a grinding position, and actuating means connected for moving said gage head into association with a workpiece transferred to the gaging station by said feeding wheel and for retracting said gage head to allow further transfer to unloading position.

References Cited in the file of this patent

UNITED STATES PATENTS

| | | |
|---|---|---|
| 1,773,937 | Binns | Aug. 26, 1930 |
| 1,991,712 | Theler | Feb. 19, 1935 |
| 2,004,427 | Booth | June 11, 1935 |
| 2,439,225 | Scrivener | Apr. 6, 1948 |
| 2,795,900 | Modler | June 18, 1957 |